Figure 1:
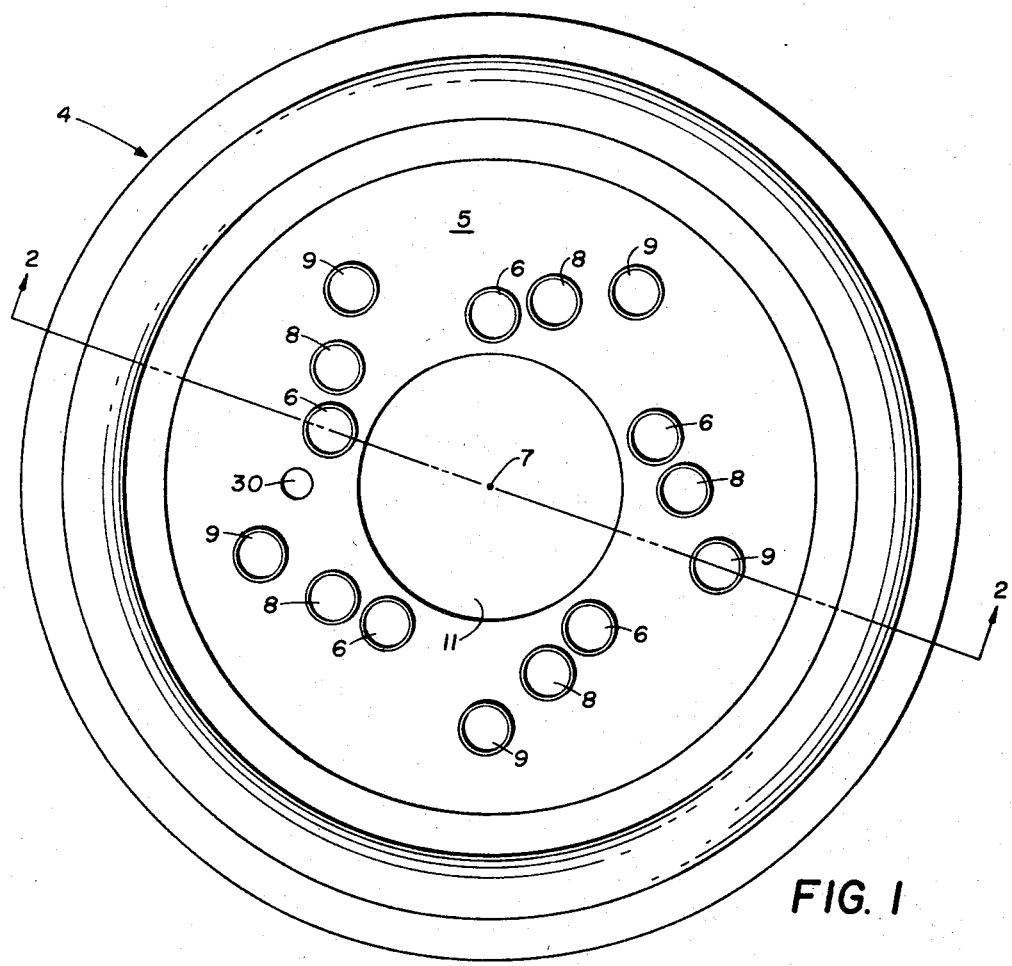

April 2, 1968     A. E. MITCHELL     3,376,075

DYNAMIC WHEEL BALANCER

Filed Aug. 19, 1966

INVENTOR
ARLAN E. MITCHELL

Richards, Harris & Hubbard

ATTORNEY

United States Patent Office 3,376,075
Patented Apr. 2, 1968

3,376,075
DYNAMIC WHEEL BALANCER
Arlan E. Mitchell, Stafford, Kans., assignor to AWB Manufacturing, Inc., Stafford, Kans., a corporation of Kansas
Filed Aug. 19, 1966, Ser. No. 573,728
3 Claims. (Cl. 301—5)

This invention relates to dynamic wheel balancers, and more particularly, but not by way of limitation, to a dynamic wheel balancer which may be installed on existing motor vehicle wheels. Dynamic wheel balancers utilized within the past several years typically have taken the form of an annular casing enclosing a plurality of balls, together with a quantity of oil or other hydraulic fluid. The balancer is concentrically mounted on the wheel, by means of clips or brackets, and in some instances devices have included weights slidable within an annular ring directly mounted to the tire of the motor vehicle. Balancing devices have also been proposed which employ a heavy liquid such as mercury which is incorporated within the tire member itself or constrained within a casing member which is affixed to the tire or the like.

Dynamic wheel balancers employing balls and a dampening fluid are designed to permit the balls to position themselves on rotation in a position substantially diametrically opposed to the mass tending to cause imbalance of the wheels. The effect of the positioning of the balls is thus to move the center of the mass of the wheel into coincidence with the center of rotation and thus eliminate vibration and uneven operation of the wheels.

The present invention provides a dynamic wheel balancer which may be easily installed on an existing motor vehicle wheel in a concentric relationship with the center of rotation of the wheel to assure that the dynamic balancer will operate in a proper fashion.

The invention may generally be described as a dynamic wheel balancer for concentric mounting on a motor vehicle wheel between a brake drum and a rim which are securable each to the other by a plurality of lug bolts. The balancer includes an annular plate which is provided with a first set of circular apertures angularly spaced about the plate to correspond with the annular spacing of the lug bolts, with the center of the apertures lying on a circle the center of which coincides with the center of the plate, and the circumference of which coincides with the circumference of a circle defined by the center of the lug bolts. Each of the apertures is defined by a substantially cylindrical wall having a diameter slightly larger than the diameter of the lug bolts. The apertures define an axis which is normal to the surface of the plate and the front-to-back depth of the aperture is at least the distance between the apexes of adjacent ridges on the threads of the lug bolts. A dynamic balance ring is carried by the plate in concentric relation to the center thereof for providing a dynamic wheel balancer which is assured of concentric mounting.

Figure 2:
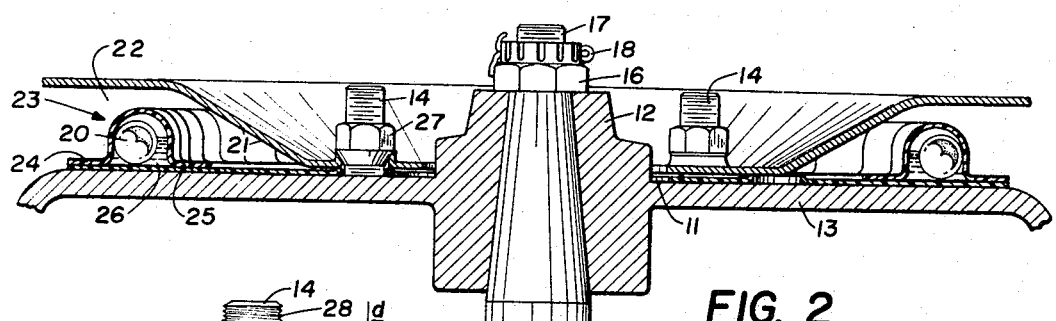
Figure 3:
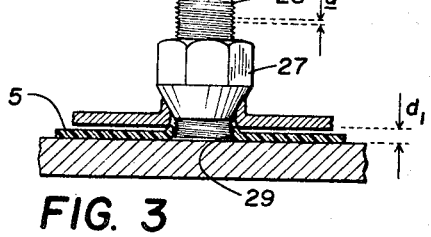

To be more specific, reference is made to the drawings, in which:

FIGURE 1 is a front elevational view of one embodiment of the present invention, FIGURE 2 is a cross-sectional view along line 2—2 and incorporating a partially cutaway view of the brake drum and rim of a vehicle to illustrate the FIGURE 1 embodiment in a mounted position, and FIGURE 3 is an enlarged view of a lug bolt and surrounding structure.

Referring now to FIGURE 1, dynamic wheel balancer 4 includes a flat annular plate 5 having a first set of angularly spaced apertures 6 at the center of each of which lies on the circumference of a circle having its center at the center of plate 5, as indicated by reference numeral 7. A second set of apertures 8 is also provided in plate 5 and each is angularly displaced from the previously mentioned apertures 7. The centers of apertures 8 also lie on a circle having a center coincident with the center of plate 5, as indicated by reference numeral 7, but having a radius greater than that of the circle defined by the centers of apertures 6. A third set of apertures 9 are also provided in plate 5, and the centers of apertures 9 lie on a third circle having its center at the center of plate 5, as indicated by reference numeral 7, but the center of each of the apertures 9 is angularly removed from the center of either aperture 6 or 8 and the radius of the circle defined by the centers of apertures 9 is greater than the radius of the circles defined by the centers of apertures 6 or 8.

As particularly illustrated in FIGURE 2, plate 5 is provided with an aperture 11 to receive a conventional wheel hub 12 which projects from a conventional brake drum 13. Brake drum 13, in a conventional manner, carries a plurality of lug bolts 14, which are uniformly spaced about hub 12. Hub 12, as illustrated, receives an axle 15 which at its threaded tip 17 carries a nut 16 and cotter key 18. Axle 15, as is well known to those skilled in the art, is rotatably carried by hub 12, which carries conventional bearing means, not illustrated. Apertures 6 of balancer 4 are mounted over lugs 14 so that the back of plate 5 abuts brake drum 13. Secured over balancer 4 is the rim 21 of the vehicle, which as illustrated forms a recess 22 within which is received the balance ring 23. Balance ring 23 comprises a generally U-shaped member having oppositely extending feet 24 and 25 which abut plate 5 and are secured thereto in a fluid tight relationship by any suitable means, such as a plastic cement. Ring 23 freely carries a plurality of balls 20 and a dampening fluid 26, which cooperate to balance the wheel assembly, as explained above, by moving the center 7 mass of the wheel into coincidence with the center of rotation for eliminating vibration and uneven operation. Rim 21 is secured over dynamic balance ring 4 by a plurality of nuts 27 in a conventional fashion.

Optimum results from a dynamic wheel balancer can only be achieved when the balance ring is mounted concentrically with the center of rotation of the wheel to be balanced and this is achieved in the present embodiment by providing structure which assures that the apertures through which lug bolts 14 are to be passed will snugly fit bolts 14. If the thickness of plate 5 is less than the distance between apexes of adjacent threads on lug bolts 14 and apertures 6 are formed by merely drilling a portion of plate 5 away, then plate 5 can, upon assembly, seat between the crest of adjacent turns of the threads 28 causing the balance ring 23 to be mounted off-center relative to axle 15.

In the embodiment illustrated in FIGURE 3, the walls 29 forming apertures 6 project from the surface of plate 5 to form a front-to-back depth, generally designated as $d_1$ in FIGURE 3 which is at least equal to, and preferably greater than, the distances between the apexes of adjacent turns of thread 28, designated $d$ in FIGURE 3. Thus, upon assembly, the apertures 6 which are only very slightly larger than the diameters of lug bolts 14, will seat on the apexes of threads 28 resulting in concentric mounting of seal ring 23 relative to axle 15. While such a construction would be more expensive, the thickness of plate 5 could be formed to have a thickness equal to or greater than the distance between the apexes of adjacent threads 28, in which event apertures 6 could be formed by drilling through plate 5.

Apertures 8 and 9 are provided to permit adapting of the wheel balancer 4 to brake drums having lug bolts positioned at different distances from the center of rotation. For example, apertures 6 have their centers lying on a circle having a diameter four and one-half inches, apertures 8 have their centers lying on a circle with a diameter of four and three-fourths inches, and apertures 9 have their centers lying on a circle having a diameter of five and one-half inches. The balancer 4 would then accommodate lug bolts having centers which lie on a circle having one of the designated diameters.

The wheel balancer 4 also preferably includes an aperture 30 through which the positioning lug on many vehicles may be passed.

Although the illustrated embodiment of the invention utilizes a plurality of balls or means for balancing ring 23, various other weight means may be used, such as lead dust, steel dust, shot, or the like having a density greater than the dampening fluid to be used, which may be a hydraulic fluid such as used in the transmission or brake system of automobiles, glycerin, or ethylene glycol. Balancer ring 4 may be constructed of various materials including polyethylene plastic, polystyrene plastic, or any suitable metal, though plastics are desired since they generate less noise during use.

To assemble the illustrated embodiment, the rim of a motor vehicle is removed and the balance ring 4 positioned over lug bolts 14 by passing such bolts through either apertures 6, 8, or 9, depending upon the particular vehicle. Rim 21 is then placed in a conventional fashion over lug bolts 14 and a plurality of nuts 27 applied.

While very specific terms have been used to describe one embodiment of the invention, they are not intended nor should they be construed as a limitation on the invention as defined by the claims.

What is claimed is:
1. A dynamic wheel balancer for concentric mounting on a motor vehicle wheel between a brake drum and a rim which are securable each to the other by a plurality of lug bolts, comprising:
   (a) an annular plate provided with a first set of circular apertures angularly spaced about said plate to correspond with the angular spacing of said lug bolts with the center of said apertures lying on a circle the center of which coincides with the center of said plate and the circumference of which coincides with the circumference of a circle defined by the center of said lug bolts,
   (b) each of said apertures being defined by a substantially cylindrical wall having a diameter slightly larger than the diameter of one of said lug bolts, an axis which is normal to the surface of said plate, and the front-to-back depth of which is at least the distance between the apexes of adjacent ridges on the threads of said lug bolts; and
   (c) a dynamic balance ring carried by said plate in concentric relationship to the center thereof;
   (d) the thickness of said plate being less than the distance between the apexes of adjacent ridges on the threads of said lug bolts and said wall defining said apertures is formed by an axially projecting portion of said plate which has a front-to-back depth of at least the distance between apexes of adjacent ridges on the thread of said lug bolts.

2. The device of claim 1 wherein the dynamic balance ring comprises:
   (a) a generally U-shaped ring having oppositely extending feet portion which abut the plate and are secured thereto for forming a fluid-tight circular annulus;
   (b) a plurality of weight means freely carried within said annulus; and
   (c) a dampening fluid carried within said annulus.

3. The device of claim 1, including a second set of apertures in said plate angularly removed from said first set and spaced concentrically about the center of said plate for adapting said balancer to lug bolts of different dimension than said first mentioned lug bolts.

References Cited
UNITED STATES PATENTS
| | | | |
|---|---|---|---|
| 2,283,860 | 5/1942 | Manning | 301—9 X |
| 2,719,756 | 10/1955 | Duke | 301—5 |
| 3,166,357 | 1/1965 | Vachon | 301—9 |
| 3,314,726 | 4/1967 | Rehnborg | 301—5 |

FOREIGN PATENTS
| | | |
|---|---|---|
| 1,417,881 | 10/1956 | France. |

RICHARD J. JOHNSON, *Primary Examiner.*